US008317648B2

(12) United States Patent
Robinette et al.

(10) Patent No.: US 8,317,648 B2
(45) Date of Patent: Nov. 27, 2012

(54) SINGLE MODE COMPOUND POWER-SPLIT HYBRID TRANSMISSION

(75) Inventors: Darrell Lee Robinette, Fenton, MI (US); Clyde A. Bulloch, Hartland, MI (US)

(73) Assignee: Gm Global Technology Operations LLC, Detroit, MI (US)

( * ) Notice: Subject to any disclaimer, the term of this patent is extended or adjusted under 35 U.S.C. 154(b) by 62 days.

(21) Appl. No.: 13/087,424

(22) Filed: Apr. 15, 2011

(65) Prior Publication Data

US 2012/0264555 A1 Oct. 18, 2012

(51) Int. Cl.
*F16H 3/44* (2006.01)

(52) U.S. Cl. ........................................ 475/317; 475/319

(58) Field of Classification Search .................. 475/1, 4, 475/5, 198, 269–330

See application file for complete search history.

(56) References Cited

U.S. PATENT DOCUMENTS

| | | | | |
|---|---|---|---|---|
| 7,288,041 | B2 * | 10/2007 | Bucknor et al. | 475/151 |
| 2005/0205314 | A1 * | 9/2005 | Imazu et al. | 180/65.2 |
| 2006/0017414 | A1 * | 1/2006 | Joe et al. | 318/432 |
| 2011/0111909 | A1 * | 5/2011 | Kim et al. | 475/5 |
| 2012/0196721 | A1 * | 8/2012 | He et al. | 477/3 |

* cited by examiner

*Primary Examiner* — Justin Holmes

(74) *Attorney, Agent, or Firm* — Quinn Law Group, PLLC

(57) ABSTRACT

A hybrid electro-mechanical transmission has an input member, an output member, and a stationary member. The transmission has a planetary gear set with a first sun gear, a second sun gear, a carrier, a first set of pinion gears, a second set of pinion gears, and a ring gear. The carrier supports the sets of pinion gears. The first set of pinion gears meshes with the first sun gear and with the ring gear. The second set of pinion gears meshes with the second sun gear and with the second set of pinion gears. The input member is connected with the ring gear. The output member is connected with the first sun gear. A first motor/generator has a rotor connected with the carrier. A second motor/generator has a rotor connected with the second sun gear. A torque-transmitting mechanism is selectively engageable to ground the input member to the stationary member.

12 Claims, 2 Drawing Sheets

SINGLE MODE COMPOUND POWER-SPLIT HYBRID TRANSMISSION

TECHNICAL FIELD

The invention relates to a hybrid electro-mechanical transmission.

BACKGROUND

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and an electrically-variable operating mode are established by engaging brakes and/or clutches in different combinations and controlling the engine and motor/generators. The various operating modes are advantageous, as they may be used to improve fuel economy.

SUMMARY

A hybrid electro-mechanical transmission is provided that can establish a power-split, electrically-variable operating mode. When installed on a vehicle, the transmission may result in increased fuel economy and efficiency over known hybrid power-split transmissions by reducing the amount of electrical recirculation occurring at elevated vehicle speeds. The transmission has an input member, an output member, and a stationary member, such as a transmission casing. As used herein, "stationary" means non-rotating. The transmission has a planetary gear set with a first sun gear member, a second sun gear member, a carrier member, a first set of pinion gears, a second set of pinion gears, and a ring gear member. Such a planetary gear set is referred to by those skilled in the art as a Ravigneaux planetary gear set. The carrier member supports the first set of pinions and the second set of pinions for rotation relative to the carrier member and relative to one another. The first set of pinion gears meshes with the first sun gear member and with the ring gear member. The second set of pinion gears meshes with the second sun gear member and with the first set of pinion gears. The input member is connected for rotation with the ring gear member. The output member is connected for rotation with the first sun gear member. A first electric motor/generator has a first rotor connected for rotation with the carrier member. A second electric motor/generator has a second rotor connected for rotation with the second sun gear member. A first torque-transmitting mechanism is selectively engageable to ground the input member to the stationary member.

When an engine with an output member is operatively connected to the transmission at the input member, the engine and the transmission provide only one electrically-variable operating mode with forward torque at the output member for forward propulsion of the vehicle. As used herein, an "electrically-variable operating mode" is a mode established in which at least one motor/generator is used along with the engine to achieve a continuously variable torque and speed ratio between the input member and the output member. Different electrically-variable operating modes are established by different combinations of torque-transmitting mechanisms. Because the transmission has only one torque-transmitting mechanism, only a single electrically-variable operating mode can be established, and the transmission may be referred to as a single mode compound power-split transmission. The single, electrically-variable operating mode is provided when the engine is on, the torque-transmitting mechanism is not engaged, and either reverse torque or forward torque is provided at the output member by controlling the motor/generators to function as motors or generators. An electric-only operating mode is provided when the torque-transmitting mechanism is engaged and one or both motor/generators are controlled to function as a motor to provide torque at the output member.

With the arrangement of the input member, the output member, the planetary gear set with two sun gear members, two sets of pinion gears, a ring gear member, and with the first and second motor/generators connected as described, the speeds of the rotors of the motor/generators remain relatively low at high speeds of the output member, so motor efficiency may be improved and the transmission may provide improved fuel economy and efficiency at elevated vehicle speeds in comparison to many other power-split hybrid transmissions by reducing electrical recirculation. Additionally, because no torque-transmitting mechanisms are engaged to establish the electrically-variable power-split operating mode, spin losses may be reduced in comparison to transmissions requiring one or more torque-transmitting mechanisms to establish a power-split electrically-variable operating mode. Furthermore, with fewer torque-transmitting mechanisms and potentially fewer planetary gear sets in comparison to other transmissions that provide a power-split electrically-variable operating mode, the transmission may have a lower cost. Depending on the design of the torque-transmitting mechanism, which may be a wet, dry or mechanical design, the need for a high pressure oil pump within the transmission may be reduced. With a dry or mechanical torque-transmitting mechanism, a low pressure oil pump can be used to provide splash cooling flow for the planetary gear set and the electric motor/generators. Furthermore, the transmission may have reduced rattle noises in comparison to other transmissions due to non-zero torque loading of all mechanical interfaces of rotating and stationary members when the engine is operational.

The above features and advantages and other features and advantages of the present invention are readily apparent from the following detailed description of the best modes for carrying out the invention when taken in connection with the accompanying drawings.

DETAILED DESCRIPTION

Figure 1:
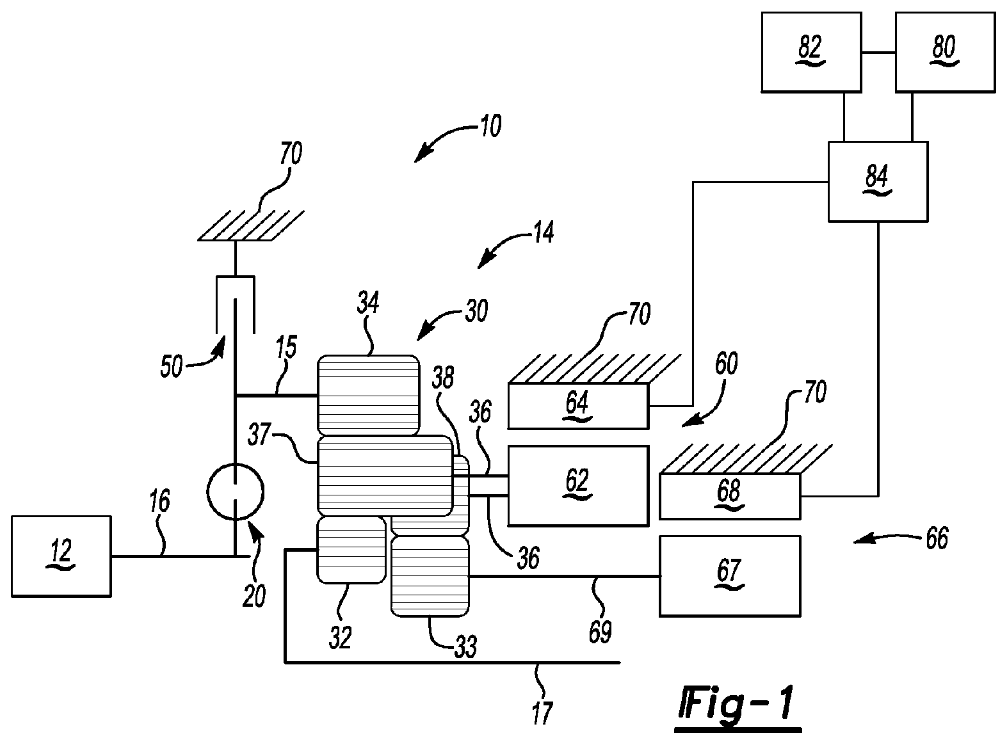
FIG. 1 is a schematic illustration of a powertrain having an engine and a first embodiment of a power-split hybrid transmission.

Referring to the drawings, wherein like reference numbers refer to like components throughout the several views, FIG. 1 shows a powertrain 10 for a vehicle that includes an engine 12 and a hybrid transmission 14. The transmission 14 has an input member 15 to which an engine output member 16 is connected through a damping mechanism 20. As used herein, an "engine" includes any power source connected for providing torque at the input member 15 that is not powered by electrical power. For example, the engine 12 may be an internal combustion engine, such as a gasoline or diesel engine, etc.

The transmission 14 includes a planetary gear set 30 that will be recognized by those skilled in the art as a Ravigneaux planetary gear set. The planetary gear set 30 has a first sun gear member 32, a second sun gear member 33, a ring gear member 34 and a planet carrier member 36. The planetary gear set 30 also includes a first set of pinion gears 37 that mesh with the sun gear member 32 and the ring gear member 34, and a second set of pinion gears 38 that mesh with the first set of planet gears 37 and with the sun gear member 33. The pinion gears 37, 38 may also be referred to as planet gears. The sets of pinion gears 37, 38 co-rotate with the carrier member 36 but also rotate with respect to the carrier member 36 at a fixed gear ratio with respect to one another. The sun gear member 32 may be referred to as a large sun gear member, and the sun gear member 33 may be referred to as the small sun gear member as the diameter of the sun gear member 32 is greater than the diameter of the sun gear member 33. The first set of pinion gears 37 may be referred to as the outer pinions and the second set of pinion gears 38 may be referred to as the inner pinions because the first set of pinion gears 37 are supported for rotation by the carrier member 36 at a greater distance from the axis of rotation of the sun gear members 32, 33 than the pinion gears 38. Only those portions of the planetary gear set 30 and motor/generators 60, 66 (discussed below) above an axis of rotation, such as the axis of the output member 17, are shown.

The transmission 14 includes a torque-transmitting mechanism 50 that is a braking clutch that is selectively engageable to connect the input member 15 to a stationary member 70, such as a housing of the transmission 14, so that the input member 15 is held stationary (i.e., does not rotate). The torque-transmitting mechanism 50 does not affect rotation of the input member 15 when not engaged. The torque-transmitting mechanism 50 may be a wet, dry or mechanical type torque-transmitting mechanism that is applied by an actuator (not shown) of the hydraulic, mechanical or electro-mechanical type.

The transmission 14 has a first motor/generator 60 with a first rotor 62. The carrier member 36 is connected for rotation with the first rotor 62. The first motor/generator 60 has a stator 64 grounded to the stationary member 70. Alternately, a stationary member separate from stationary member 70 may be used. The transmission 14 also has a second motor/generator 66 with a second rotor 67 that has a second rotor hub 69 connected for rotation with the sun gear member 33. The motor/generator 66 has a stator 68 grounded to the stationary member 70 or to a separate stationary member.

An energy storage device, such as a battery 80, is operatively connected by transfer conductors to the stators 64, 68. A controller 82 controls electrical transfer between the battery 80 and the stators 64, 68 through a power inverter 84 that changes direct current provided by the battery 80 to alternating current required for operation of the motor/generators 60, 66 (and vice versa when the motor/generators 60, 66 are operated as generators).

Figure 2:
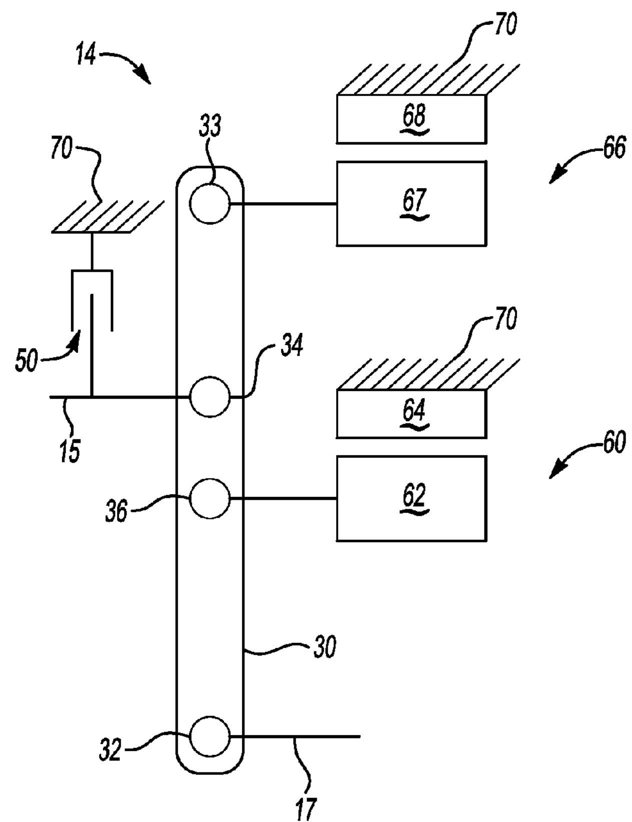
FIG. 2 is a schematic illustration of the transmission of FIG. 1 in lever diagram form.

Referring to FIG. 2, the transmission 14 is shown in lever diagram form with the planetary gear set 30 as a four node lever. The ring gear member 34 is a first node, the sun gear member 32 is a second node, the sun gear member 33 is a third node, and the carrier member 36 is a fourth node. The lever diagram representation of the transmission 14 illustrates that, because the planetary gear set 30 is a Ravigneaux gear set, the four components illustrated as the four nodes can rotate at different speeds causing different torques on the lever. In lever diagrams, torque applied at each node is represented as an arrow having a magnitude corresponding to the magnitude of the torque and pushing on the lever at that node, in a direction corresponding to the direction of the torque. The lever must be balanced. Accordingly, the interconnections of the transmission 14 are designed by engineers to achieve desired engine and motor speeds for efficiency purposes while still meeting torque balance requirements.

The powertrain 10 is operable in an electric-only operating mode that provides forward propulsion when the torque-transmitting mechanism 50 is engaged and the engine 12 is off. In this mode, the motor/generator 60 operates as a motor to provide torque to or receive torque from the carrier member 36 while the motor/generator 66 operates as a motor or a generator to provide torque to or receive torque from the sun gear member 33, thus balancing the planetary gear set 30 in the lever of FIG. 2 with ring gear member 34 held stationary, and the output member 17 rotating in a direction that provides forward propulsion to a vehicle. The motor/generators 60, 66 have the same power, with different speeds and torques.

The powertrain 10 provides an electric-only operating mode that provides reverse propulsion when the torque-transmitting mechanism 50 is engaged, the engine 12 is off, and the speeds and directions of rotations of the rotors 62, 67 are controlled to cause the output member 17 to rotate in a reverse direction of rotation (i.e., a direction of rotation that will cause wheels of a vehicle to turn in a reverse direction).

A hybrid compound-split electrically-variable operating mode with reverse torque at the output member 17 for reverse propulsion of the vehicle may be established when the torque-transmitting mechanism 50 is not engaged, the engine 12 is on to provide torque at the input member 15, the motor/generator 60 is controlled to hold the carrier member 36 stationary and the motor/generator 66 is operated as a motor in a direction of rotation that causes the output member 17 to rotate in a reverse direction of rotation.

The powertrain 10 is also operable in the hybrid compound-split electrically-variable operating mode to provide forward torque at the output member 17 for forward propulsion of the vehicle when the torque-transmitting mechanism 50 is not engaged, the engine 12 is on to provide torque to the input member 15, and the motor/generators 60, 66 are operated as motors or generators as necessary to balance the torques on the planetary gear set 30, as described with respect to FIG. 2.

The single, electrically-variable operating mode is a compound-split operating mode, which is one type of power-split operating mode. A compound-split mode has both motor/generators 60, 66 geared such that their speeds are linear combinations of the speeds of the input member 15 and the output member 17, but neither is in direct proportion to either the speed of the input member 15 or the speed of the output member 17. The arrangement of the members of the Ravigneaux gear set 30 establishes this combination of speeds.

Figure 3:
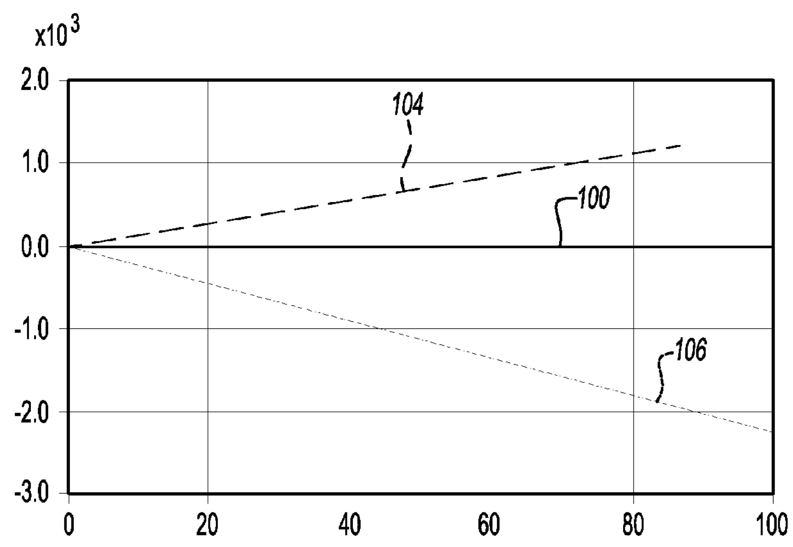
FIG. 3 is a chart of the speeds in revolutions per minute of various components of the powertrain of FIG. 1 versus vehicle speed in miles per hour during an electric operating mode.
Figure 4:
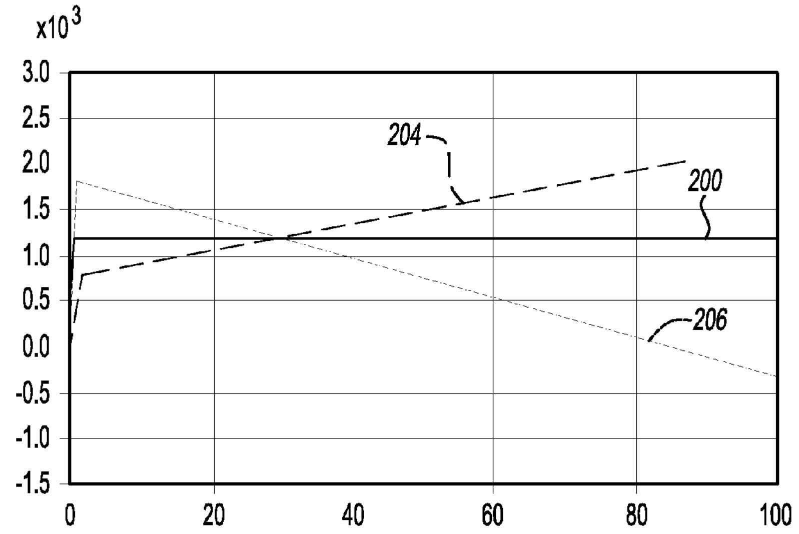
FIG. 4 is a chart of the speeds in revolutions per minute of various components of the powertrain of FIG. 1 versus vehicle speed in miles per hour during a power-split operating mode with the engine speed at 1200 revolutions per minute.
Figure 5:
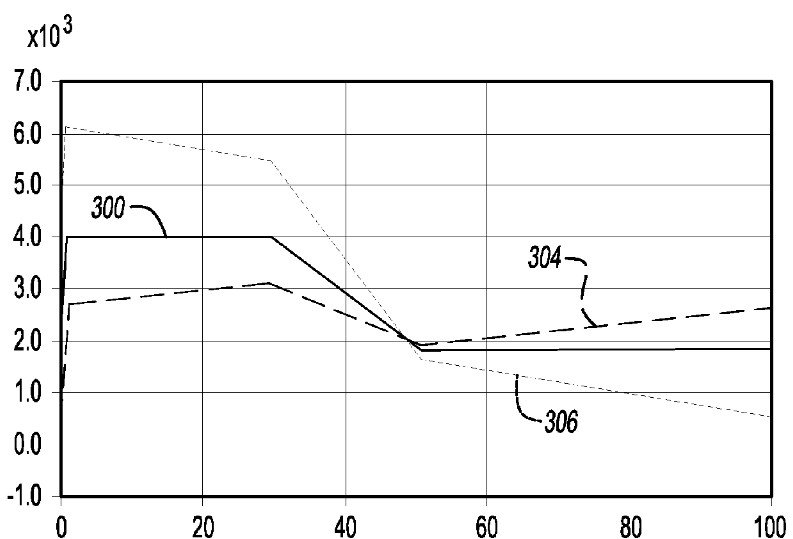
FIG. 5 is a chart of the speeds in revolutions per minute of various components of the powertrain of FIG. 1 versus vehicle speed in miles per hour during a power-split operating mode with the engine at various operating speeds between 4000 and 1800 revolutions per minute.

FIGS. 3-5 show theoretical speeds in revolutions per minute (rpm) of the engine 12 and the rotors 62, 67 of the motor/generators 60, 66 versus vehicle speed in miles per hour (mph) when the powertrain 10 is installed on a vehicle with the output member 17 driving the wheels. For example, in FIG. 3, during the electric-only (forward propulsion) operating mode. When the torque-transmitting mechanism 50 is engaged, the engine 12 is off and the engine output member 16 and the transmission input member 15 are held stationary. The speed of the engine 12 is represented as line 100. The first motor/generator 60 is controlled to function as a motor so that the speed of the rotor 62 and carrier member 36 increases with increasing vehicle speed (i.e., with increasing speed of the output member 17). The speed of the rotor 62 is represented as line 104. The second motor/generator 66 is controlled to function as a motor with a direction of rotation of the rotor 67 and sun gear member 33 opposite to that of the rotor 62 and carrier member 36. The speed of the rotor 67 is represented as line 106 and also increases in magnitude with increasing vehicle speed (i.e., with increasing speed of the output member 17).

FIG. 4 shows the speed of the engine output member 16 in revolutions per minute versus vehicle speed in miles per hour as line 200, the speed of the rotor 62 in revolutions per minute versus vehicle speed in miles per hour as line 204, and the speed of the rotor 67 in revolutions per minute versus vehicle speed in miles per hour as line 206. FIG. 4 represents the hybrid power-split operating mode in which the torque-transmitting mechanism 50 is not engaged and in which the engine 12 is controlled to operate at approximately 1200 rpm over the vehicle speed range shown. The engine speed of 1200 rpm may be a predetermined optimal operating speed for fuel efficiency for the engine 12.

FIG. 5 shows the speed of the engine output member 16 in revolutions per minute versus vehicle speed in miles per hour as line 300, the speed of the rotor 62 in revolutions per minute versus vehicle speed in miles per hour as line 304, and the speed of the rotor 67 in revolutions per minute versus vehicle speed in miles per hour as line 306. FIG. 5 represents the hybrid power-split operating mode in which the torque-transmitting mechanism 50 is not engaged and in which the engine 12 is controlled to operate at approximately 4000 rpm at vehicle speeds from 0 to 30 mph, at 1800 rpm at vehicle speeds from 55 mph and above, and at a smooth shifting between 400 rpm and 1800 rpm at vehicle speeds between 30 mph and 55 mph.

In FIG. 5, the speed of the engine 12 at lower vehicle speeds represents the speed necessary to provide sufficient torque to launch the vehicle. The speed of the engine 12 at higher vehicle speeds (e.g., 55 mph and above) represents a lower torque, efficient cruising speed such as for highway cruising. The speeds of both rotors 62, 67 necessarily vary as the speed of the engine 12 varies to balance torque through the planetary gear set 30. As indicated in FIG. 5, both rotors 62, 67 are at relatively low speeds at the higher vehicle speeds, such as at 55 mph and greater. The lower rotor speeds correspond with relatively low electrical recirculation at these speeds. For example, electrical recirculation in the transmission 14 under the operating conditions indicated at a vehicle speed of 55 mph in FIG. 5 may be about 37 percent of mechanical power (i.e., the amount of power supplied at the input member 15), while the electrical recirculation in typical power-split hybrid transmissions may be as high as 65 percent of mechanical power at engine speeds between 1200 and 1800 rpm.

Accordingly, the transmission 14 provides a compound power-split electrically-variable operating mode that may increase fuel economy, decrease electrical recirculation in the transmission, and minimize spin losses. The transmission 14 has a relatively low number of components in comparison with other transmissions that use multiple planetary gear sets and torque-transmitting mechanisms to establish the electrically-variable power-split operating mode.

While the best modes for carrying out the invention have been described in detail, those familiar with the art to which this invention relates will recognize various alternative designs and embodiments for practicing the invention within the scope of the appended claims.

The invention claimed is:

1. A transmission comprising:

an input member;

an output member;

a stationary member;

a planetary gear set having a first sun gear member, a second sun gear member, a carrier member, a first set of pinion gears, a second set of pinion gears, and a ring gear member; wherein the carrier member supports the first set of pinion gears and the second set of pinion gears for rotation relative to the carrier member and relative to one another; wherein the first set of pinion gears meshes with the first sun gear member and with the ring gear member; wherein the second set of pinion gears meshes with the second sun gear member and with the first set of pinion gears;

wherein the input member is connected for rotation with the ring gear member;

wherein the output member is connected for rotation with the first sun gear member;

a first electric motor/generator having a first rotor connected for rotation with the carrier member;

a second electric motor/generator having a second rotor connected for rotation with the second sun gear member; and a first torque-transmitting mechanism selectively engageable to ground the input member to the stationary member.

2. The transmission of claim 1 in combination with an engine having a rotatable engine output member operatively connected with the input member; wherein the torque-transmitting mechanism is disengaged, the engine is on, and the motor/generators are each operated as a motor or as a generator such that forward torque is provided at the output member in a compound power-split electrically-variable operating mode.

3. The transmission of claim 1 in combination with an engine having a rotatable engine output member operatively connected with the input member; wherein the torque-transmitting mechanism is engaged, the engine is off, and the motor/generators are each operated as a motor or as a generator such that forward torque is provided at the output member in an electric-only operating mode.

4. The transmission of claim 1 in combination with an engine having a rotatable engine output member operatively connected with the input member; wherein the torque-transmitting mechanism is disengaged, the engine is on, the first motor/generator is operated as a motor or as a generator as required to hold the carrier member stationary, and the second motor/generator is operated as a motor or as a generator such that reverse torque is provided at the output member in a compound power-split electrically-variable operating mode.

5. The transmission of claim 1 in combination with an engine having a rotatable engine output member operatively connected with the input member; wherein the torque-transmitting mechanism is engaged, the engine is off, and the motor/generators are each operated as a motor or as a generator such that reverse torque is provided at the output member in an electric-only propulsion mode.

6. A powertrain for a vehicle comprising:

an engine;

a transmission having an input member operatively connected to the engine;

an output member;

a stationary member;

a planetary gear set having a first sun gear member, a second sun gear member, a carrier member, a first set of pinion gears, a second set of pinion gears, and a ring gear member; wherein the carrier member supports the first set of pinion gears and the second set of pinion gears for rotation relative to the carrier member and relative to one another; wherein the first set of pinion gears meshes with the first sun gear member and with the ring gear member; wherein the second set of pinion gears meshes with the second sun gear member and with the first set of pinion gears;

wherein the input member is connected for rotation with the ring gear member;

wherein the output member is connected for rotation with the first sun gear member;

a first electric motor/generator having a first rotor connected for rotation with the carrier member;

a second electric motor/generator having a second rotor connected for rotation with the second sun gear member;

only one torque-transmitting mechanism operatively connected to any of said members of said planetary gear set; wherein said only one torque-transmitting mechanism is selectively engageable to ground the ring gear member to the stationary member; and wherein said powertrain is operable to establish only one electrically-variable operating mode.

7. The powertrain of claim 6, wherein said only one electrically-variable operating mode is a power-split electrically-variable operating mode established when the torque-transmitting mechanism is disengaged, the engine is on, and the motor/generators are each operated as a motor or as a generator as required such that forward torque is provided at the output member.

8. The transmission of claim 7, wherein the powertrain is operable to provide reverse torque at the output member in the power-split electrically-variable operating mode when the torque-transmitting mechanism is disengaged, the engine is on, torque is provided to the first motor/generator to hold the carrier member stationary, and the second motor/generator is operated as a motor or as a generator such that reverse torque is provided at the output member.

9. The transmission of claim 6, wherein the powertrain is operable to establish an electric-only operating mode with forward torque at the output member when the torque-transmitting mechanism is engaged, the engine is off, and the motor/generators are each operated as a motor or as a generator as required such that forward torque is provided at the output member.

10. The transmission of claim 6, wherein the powertrain is operable to establish an electric-only propulsion mode with reverse torque at the output member when the torque-transmitting mechanism is engaged, the engine is off, and the motor/generators are each operated as a motor or as a generator as required such that reverse torque is provided at the output member.

11. A transmission comprising:

an input member;

an output member;

a stationary member;

a Ravigneaux planetary gear set having a first member, a second member, a third member and a fourth member;

wherein the input member is connected for rotation with the first member;

wherein the output member is connected for rotation with the second member;

a first electric motor/generator having a first rotor connected for rotation with the third member;

a second electric motor/generator having a second rotor connected for rotation with the fourth member; and a first torque-transmitting mechanism selectively engageable to ground the input member to the stationary member.

12. The transmission of claim 11, wherein the first member is a first sun gear member, the second member is a ring gear member, the third member is a carrier member, the fourth member is a second sun gear member; wherein the Ravigneaux planetary gear set further includes a first set of pinion gears and a second set of pinion gears supported for rotation by the carrier member; wherein the first set of pinion gears meshes with the first sun gear member and with the ring gear member; and wherein the second set of pinion gears meshes with the second sun gear member and with the first set of pinions.

* * * * *